United States Patent [19]

Matsui et al.

[11] Patent Number: 4,755,561

[45] Date of Patent: Jul. 5, 1988

[54] POLY(DISUBSTITUTED ACETYLENE)/POLYORGANOSILOXANE GRAFT COPOLYMER AND MEMBRANE FOR GAS SEPARATION

[75] Inventors: Kiyohide Matsui; Yu Nagase; Masaki Uchikura, all of Sagamihara, Japan

[73] Assignees: Sagami Chemical Research Center, Tokyo; Tosoh Corporation, Yamaguchi, both of Japan

[21] Appl. No.: 119,444

[22] Filed: Nov. 12, 1987

Related U.S. Application Data

[62] Division of Ser. No. 58,230, Jun. 8, 1987.

[51] Int. Cl.[4] ............................................. C08F 8/00
[52] U.S. Cl. .................................... 525/105; 525/100; 525/104; 525/106
[58] Field of Search ................ 525/100, 104, 105, 106

[56] References Cited

U.S. PATENT DOCUMENTS

| | | | |
|---|---|---|---|
| 3,929,850 | 12/1975 | Streck et al. | 525/105 |
| 4,239,793 | 12/1980 | Matsuura et al. | 525/100 |
| 4,565,846 | 1/1986 | Saito et al. | 525/106 |

*Primary Examiner*—Morton Foelak
*Attorney, Agent, or Firm*—Sughrue, Mion, Zinn, Macpeak, and Seas

[57] ABSTRACT

A membrane for selectively separating gases having high and selective permeability for oxygen and sufficient strength which is capable of extracting and concentrating oxygen in a mixed gases, especially in the air, and is produced from a novel poly(disubstituted acetylene)/polyorganosiloxane graft copolymer where the main chain is composed of poly(disubstituted acetylene) and the side chain is composed of polyorganosiloxane, and the copolymer.

1 Claim, No Drawings

POLY(DISUBSTITUTED ACETYLENE)/POLYORGANOSILOXANE GRAFT COPOLYMER AND MEMBRANE FOR GAS SEPARATION

This is a division of application Ser. No. 058,230 filed June 8, 1987.

DESCRIPTION

TECHNICAL FIELD

The present invention relates to a novel poly(disubstituted acetylene)/polyorganosiloxane graft copolymer, where the main chain is composed of poly(disubstituted acetylene) and the side chain is composed of polyorganosiloxane, and a membrane prepared from the copolymer useful for separation of a gaseous mixture. More particularly, the membrane to which the present invention relates is a gas separation membrane which has high membrane strength and sufficient permeability and excellent selectivity for oxygen suitable enough to concentrate oxygen in the air.

BACKGROUND ART

Gas separation techniques using a membrane are rapidly developing their applications because of economy of energy, high safety and simpleness in handling. Among them, the technique with which oxygen is separated from other members in a mixture of gases is useful, particularly when the mixture of gases is the air and the technique is employed to concentrate oxygen. If an oxygen-enriched air could be produced from air in a simple and economical way, a large contribution is expected in many fields of industry, for example, a variety of combustion engines, medical instruments, food industry, and disposal of industrial exhausts.

Membranes which are employed for these purposes should desirably bear the characteristics; a large ratio of the permeability coefficients of oxygen gas upon nitrogen gas and a large permeability for oxygen gas. Especially the latter is more important, because a larger amount of oxygen per unit time permits the separation apparatus to be smaller and the amount of treated gas to be increased. A large permeation of oxygen gas can be obtained by choosing a material of a high permeability coefficient $P_{O2}$ for oxygen and making the thickness of the membrane as thin as possible. Thus, the material of the membrane should have sufficient strength enough to sustain the gaseous pressure when formed in a thin film.

Among the polymer membranes ever known, polydimethylsiloxane membranes typically represent those having the largest permeability coefficient P for gases (if not otherwise specified, unit of the permeability coefficient is expressed hereinafter in $cm^3(STP) \cdot cm/cm^2 \cdot sec \cdot cmHg$). Although the permeability coefficient $P_{O2}$ for oxygen is as high as $6 \times 10^{-8}$, the separation coefficient $\alpha$ between oxygen and nitrogen gases (the permeability coefficient $P_{O2}$ for oxygen gas divided by the permeability coefficient $P_{N2}$ for nitrogen gas) is as low as 2.0. Further, a membrane of polydimethylsiloxane is low in the mechanical strength and therefore a membrane not more than several ten $\mu m$ thick can not be employed for practical uses. Thus, polydimethylsiloxane does not provide a membrane of sufficient high permeability for oxygen in the practical sense. For improving the membrane characteristics of polydimethylsiloxane, copolymers of polydimethylsiloxane with polymers of high mechanical strength such as polycarbonate and poly-α-methylstyrene have been developed (for example, as disclosed in U.S. Pat. Nos. 3,980,456, 3,874,986 and in Japanese Laid-Open patent application No. Sho 56-26504). But result was not always satisfactory because of the lowered permeability coefficient $P_{O2}$ for oxygen or the insufficient separation coefficient $\alpha$.

On the other hand, as a material having a higher permeability coefficient for gases than polydimethylsiloxane is known poly(disubstituted acetylene) represented by polytrimethylsilylpropyne (J. Am. Chem. Soc., 1983, 105, p.7473 and J. Appl. Polym. Sci., 1985, 30, p.1605). Membranes prepared from polytrimethylsilylpropyne have a permeability coefficient $P_{O2}$ for oxygen $4-7 \times 10^{-7}$ and a separation coefficient $\alpha$ 1.7–2.0. This material can be processed in the form of membrane due to its excellent film strength. However, if used as separation membrane for oxygen, sufficiently high oxygen concentration is not obtained owing to the small separation coefficient $\alpha$ and a further defect is that the permeability coefficient for oxygen is lowered during a prolonged use.

The present invention has been pursued with the aim to solve the difficulties of previous gas separation membranes, particularly of membranes prepared from poly(disubstituted acetylene), and provides a novel membrane material having sufficiently high membrane strength, excellent permeability and selectivity for gases and a stable permeability coefficient for gases.

Being interested in the excellent membrane strength and a high gas permeability coefficient of poly(disubstituted acetylene) represented by polytrimethylsilylpropyne, the present inventors looked eagerly for a novel material for membrane which assures a high separation coefficient for gases and a stable gas permeability coefficient. As a result, they found that poly(disubstituted acetylene)/polyorganosiloxane graft copolymer which was obtained by introducing polysiloxane chains into poly(disubstituted acetylene) gave a membrane having, as well as a good permeability coefficient for gases and sufficient strength, a better gas separation coefficient over that of both poly(disubstituted acetylene) and polyorganosiloxane and a stable permeability coefficient for gases. Thus, the present invention has been achieved.

DISCLOSURE OF INVENTION

The present invention relates to a poly(disubstituted acetylene)/polyorganosiloxane graft copolymer and a membrane prepared therefrom for separating mixed gases, comprising the repeating unit of said copolymer being expressed by the following general formula:

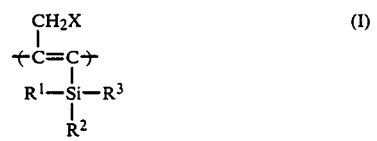

(I)

(where $R^1$-$R^3$ are the same or different groups selected from alkyl, substituted alkyl, phenyl, and substituted phenyl groups and X is a hydrogen atom or a group expressed by the following general formula:

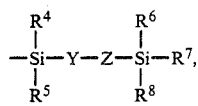

and $R^1$-$R^3$ and X may be arbitrarily different for different repeating units. Y is an oxygen atom or a divalent organic group. Z is a polyorganosiloxane chain and $R^4$-$R^8$ are alkyl, substituted alkyl, phenyl or substituted phenyl group and they may be the same or different to each other), the ratio in moles of the repeating units on the main chain, poly(substituted acetylene), to the repeating units on the side chain, polyorganosiloxane, being in the range from 90/10 to 10/90 and the molecular weight being not less than 10,000.

The divalent organic group mentioned in the definition above may be exemplified by substituted or unsubstituted polymethylene chain (containing two or more carbon atoms), phenylenepolymethylene group, or a group expressed by

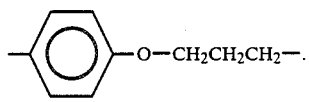

The polyorganosiloxane chain in the above definition is the polysiloxane chain in which the repeating unit is expressed by the following general formula:

(where $R^9$ and $R^{10}$ are selected from alkyl, substituted alkyl, phenyl and substituted phenyl groups and they may be the same or different to each other and may be different in different repeating units).

The poly(disubstituted acetylene)/polyorganosiloxane graft copolymer of the present invention which is constituted from the repeating unit expressed previously by the general formula (I) can be prepared, for example, from a poly(disubstituted acetylene) of which repeating unit is expressed by the following general formula:

(where $R^1$-$R^3$ are selected from alkyl, substituted alkyl, phenyl and substituted phenyl groups and they may be the same or different to each other and may be different in different repeating units) by the reaction with a strong base followed by the reaction with polyorganosiloxane which is reactive at one terminal and expressed by the following general formula:

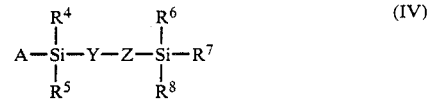

(where A is a halogen atom, Y is an oxygen atom or a divalent organic group, Z is a polyorganosiloxane chain and $R^4$-$R^8$ are selected from alkyl, substituted alkyl, phenyl and substituted phenyl groups and may be the same or different to each other).

The starting material poly(disubstituted acetylene) composed of the repeating units expressed by the general formula (III) is exemplified by the following compounds: poly(trimethylsilylpropyne), poly(ethyldimethylsilylpropyne), poly(propyldimethylsilylpropyne), poly(triethylsilylpropyne), poly(3,3,3-trifluoropropyldimethylsilylpropyne), poly(3,3,3-trifluoropropyldiethylsilylpropyne), poly(trimethylsilylmethyldimethylsilylpropyne), poly(trimethylsilylethyldimethylsilylpropyne), poly(phenyldimethylsilylpropyne), poly(pentafluorophenyldimethylsilylpropyne), poly(β-phenetyldimethylsilylpropyne), poly(phenyldiethylsilylpropyne) and a copolymer therefrom which is composed of two or more repeating units of the polymers listed above.

The poly(disubstituted acetylenes) composed of the repeating units which are expressed by the general formula (III) can be prepared by polymerization of one or more disubstituted acetylenes as starting material in an organic solvent usually at a temperature 30°-100° C. for 2-36 hours. The polymerization reaction is carried out in the presence of a halogenide of tantalum or niobium of V groups transition metals such as tantalum pentachloride, niobium pentachloride, tantalum pentabromide, niobium pentabromide as catalyst. With regard to solvent, aromatic hydrocarbons such as benzene, toluene, and xylene, alicyclic hydrocarbons such as cyclohexane, and chlorinated solvents such as chloroform, 1,2-dichloroethane and carbon tetrachloride may be used.

In addition to the main catalysts referred to above, a second component of the catalyst selected from those organometallic compounds which contain aluminum, silicon, tin, and antimony may be used as co-catalyst to produce the aimed copolymer. Examples of the organometallic compounds are trimethylaluminum, triethylaluminum, hydrosilane derivatives, tetraphenyltin, tetra-n-butyltin and triphenylantimony.

The strong bases which are used for the reaction of the poly(disubstituted acetylene) composed of the repeating units expressed by the general formula (III) with the polyorganosiloxane which is reactive at one terminal as expressed by the general formula (IV) include organolithium compounds such as methyllithium, n-butyllithium, t-butyllithium, phenyllithium and lithium diisopropylamime, alkali metal hydrides such as potassium hydride and sodium hydride, and Grignard compounds such as methylmagnesium iodide, ethylmagnesium bromide and phenylmagnesium bromide. Among them, however, organolithium compounds are preferred from the reaction efficiency. These strong bases are employed usually in a 0.1-4 times as much amount in equivalents as that of the repeating unit of the starting poly(disubstituted acetylene). The ratio of the introduction of polyorganosiloxane chain can be controlled by changing the amount of the strong base.

There is no particular requirement to the solvent for the reactions of this invention. The only requirement is that the solvent in concern dissolves both poly(disubstituted acetylene) and polyorganosiloxane. Organic solvents that may be used include, for example, tetrahydrofurane, toluene, benzene, xylene and n-hexane. The reaction usually proceeds smoothly at a temperature around and below 0° C.

The polyorganosiloxanes which are reactive at one terminal as expressed by the general formula (IV) shown above include, for example,

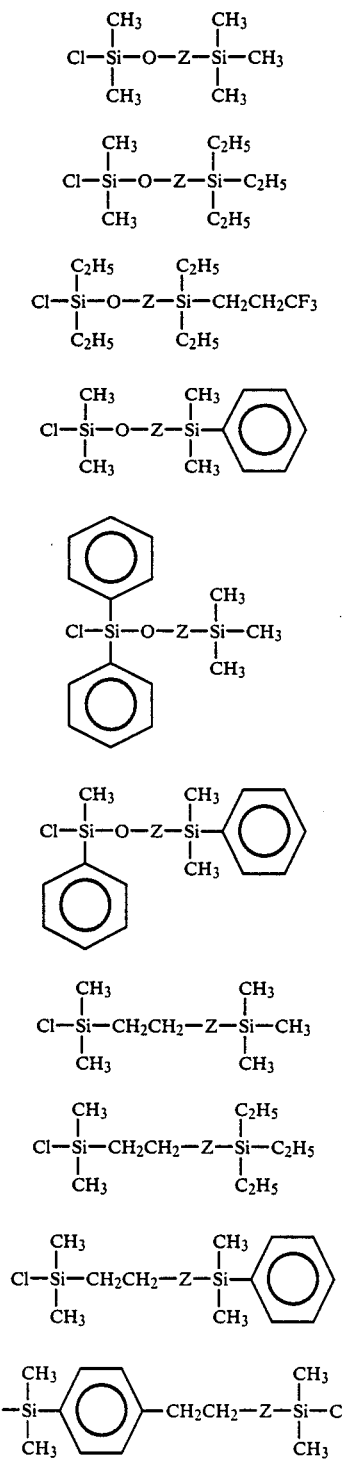

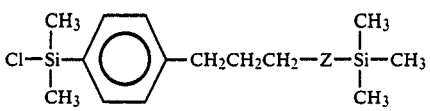

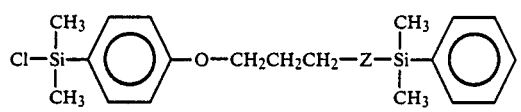

In the formulae shown above, Z is a polyorganosiloxane chain of which repeating unit is expressed by the general formula (II). Followings are examples of Z.

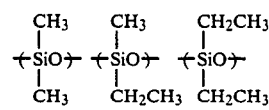

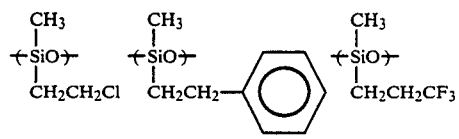

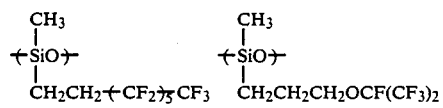

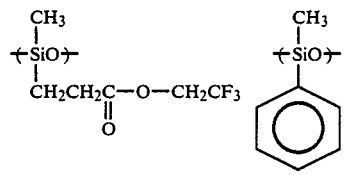

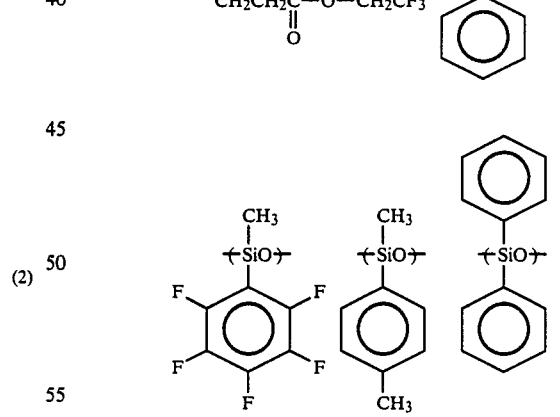

Among the polyorganosiloxanes which are reactive at one terminal as listed above, the compounds of Group (1) are prepared as follows: the reaction is illustrated by the following reaction scheme. A trisubstituted silanol is reacted with an equimolar amount of n-BuLi to form silanolate anion which behaves as initiator for the living anion polymerization of a cyclosiloxane compound. The reaction is terminated by use of a halosiloxane compound having a reactive substituent.

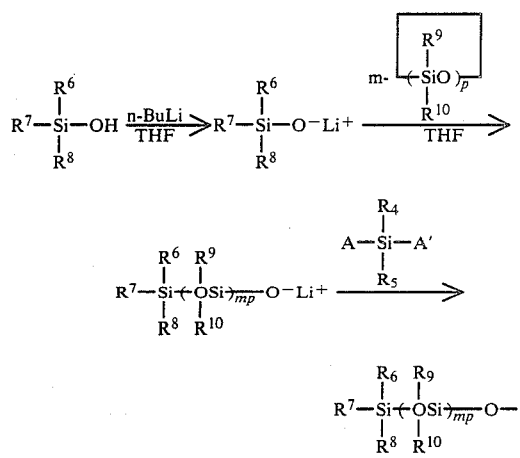

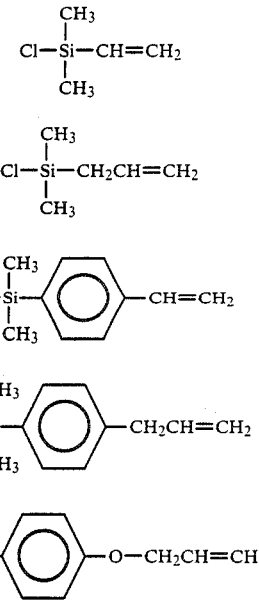

(where m is a positive integer and p is an integer of 3 or larger, A and A' are the same or different halogen atoms, and $R^4$-$R^{10}$ are selected from alkyl, substituted alkyl, phenyl, substituted phenyl groups and may be the same or different from each other. $R^9$ and $R^{10}$ may be arbitrarily different in different repeating units.)

Alternatively, the same reaction product can be obtained from the above silanolate anion by the reaction with an equimolar amount of α, ω-dichloropolyorganosiloxane.

The polyorganosiloxanes which are reactive at one terminal belonging to Group (2) as listed above are prepared in the following manner: using the silane compound expressed by the following general formula,

(where $R^9$ and $R^{10}$ have the same meaning as above) in place of the compound expressed by the following general formula that appears in the above reaction formula,

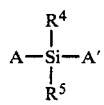

a polyorganosiloxane which has hydrosily group at one terminal as expressed by the general formula (VI) is prepared in the similar process:

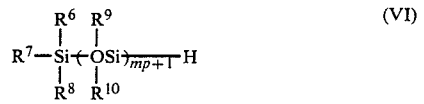

(where $R^6$-$R^{10}$, m and p have the same meaning as above) and the hydrosilylation reaction of this compound with a chlorosilane compound having a double bond affords the polyorganosiloxane in Group (2) which is reactive at one terminal.

Examples of the chlorosilane compound employed in this stage of the process are as follows:

When the polyorganosiloxane expressed by the general formula (IV) which is reactive at one terminal is employed in 0.5–3.0, preferably 0.9–2.0, times as much amount in equivalent as a strong base, the object compound aimed can be obtained with a good yield.

The graft copolymer of this invention is soluble in aromatic solvents such as toluene, benzene, ethylbenzene and xylene, halogenated hydrocarbons such as carbon tetrachloride, chloroform and trichloroethylene, hydrocarbon solvents such as n-hexane, cyclohexane and cyclohexene and ether solvents such as tetrahydrofurane, but insoluble in alcohols and in water.

When the graft copolymer of this invention is used for preparing a membrane for gas separation, the ratio in moles of the repeating units on the main chain, poly(disubstituted acetylene), to the repeating units on the side chain, polyorganosiloxane, should suitably be in the range from 90/10 to 10/90, more preferably 70/30 to 20/80. If the organosiloxane units amounts below the ratio, the gas permeability characteristics of the membrane produced remains almost the same as that of the starting material poly(disubstituted acetylene). Thus, the separation coefficient for oxygen to nitrogen is about 1.7 and the permeability coefficient for oxygen may be reduced during a long term use.

On the other hand, the amount of the organosiloxane units exceeds the range, the glass transition point of the graft copolymer is lowered too much and therefore it becomes difficult to form films therefrom. The graft copolymer within the suitable range of molar ratio can be obtained only by adjusting the amount of the strong base, the amount of the polyorganosiloxane which is reactive at one terminal as expressed by the general formula (IV) and the length of chain.

Further, the graft copolymer of the present invention preferably has a large molecular weight from the point of strength of membrane. Thus, the molecular weight is usually 10,000 or more, preferably 100,000 or more.

Membranes of the graft copolymer of this invention may be produced in any known process, but not restricted to any particular process. For example, membranes can be produced from a cast solution by evaporating the solvent on a metal or glass plate or on a water surface. Otherwise, the solution is applied on a porous support by dipping it in the solution and then dried to form a film.

The membranes of this invention as thick as 0.05–100 μm, particularly 0.1–50 μm, are favored to be given sufficient permeability for gases and strength for practical uses. A thin membrane not more than 1 μm thick is desirably used with a support. The support may be a porous one such as prepared of a woven fabric, an unwoven fabric, a microfilter or an ultrafilter membrane which is strong enough to hold the membrane.

The membranes of this invention are employed in any form including flat, tubular, and hollow-fiber forms.

When a mixture of gases is separated into component gases and each of them is concentrated by use of a membrane prepared from the graft copolymer of the present invention, the gases as object of this invention include hydrogen, helium, oxygen, nitrogen, carbon dioxide, carbon monoxide, methane, ethane, propane, and ethylene.

The membrane of this invention prepared from the graft copolymer having side chains of polysiloxane maintains the mechanical strength and the high permeability for gases which are exhibited by membranes of the starting materials, poly(disubstituted acetylene), and further exhibits excellent selectivity for separation of gases, with a high separation coefficient (for example 2.0 or high for oxygen, nitrogen separation). Since in addition the membrane of this invention is particularly excellent in strength, a membrane as thin as 0.05–0.1 μm can be possibly provided as required for practical uses.

BEST MODE FOR CARRYING OUT THE INVENTION

The present invention is illustrated below using Examples and Reference Examples to demonstrate it in detail. However, the invention is not restricted of course by these Examples.

The gas permeability coefficients appearing in Examples were measured by the high vacuum pressure method at 25° C.

REFERENCE EXAMPLE 1

(Preparation of polytrimethylsilylpropyne)

1-Trimethylsilylpropyne in an amount of 42.6 g was dissolved in 300 ml of toluene and 2.4 g of tantalum pentachloride was added to the solution. The mixture was placed in a stainless steel polymerization tube, de-aerated and then the tube was sealed. Shaking for 24 hours at 80° C. gave a viscous gel-like polymer. The polymer was dissolved in toluene, and reprecipitated several times from a large amount of methanol. A white fibrous matter obtained was dried in vacuum at 60° C. Yield was 38.5 g (90.3%). By estimating with IR, $^1$H-NMR, $^{13}$C-NMR and elementary analysis, the product was proved to be poly(1-trimethylsilylpropyne) aimed at. The GPC measurement gave the number-average and the weight-average molecular weights being $5.36 \times 10^5$ and $2.26 \times 10^{61}$, respectively, calculated as polystyrene.

REFERENCE EXAMPLE 2

(Preparation 1 of polysiloxane reactive at one terminal)

14.2 g (0.157 mol) of trimethylsilanol was dissolved in 200 ml of dry THF to which 100 ml (0.16 mol) of a n-butyllithium in hexane (1.6 mol/l) was added under a stream of argon. After 10 min stirring, a solution of 93.4 g (1.26 mol) of hexamethylcyclotrisiloxane dissolved in 200 ml of dry THF was added, and the mixture was stirred under a stream of argon for 21 hr at room temperature. To this solution, 60 ml (0.551 mol) of dimethylchlorosilane was added as terminator to stop the living polymerization.

The solvent was removed under a reduced pressure, deposited salt was removed by filtration, and unreacting cyclohexane and excess of the terminator were removed by heating for 3 hr at a temperature of 150° C. under a reduced pressure not more than 0.1 mmHg. A colorless transparent viscous liquid was obtained in an amount of 111.3 g. By measuring with IR and NMR, this polymer was confirmed to have the following structure:

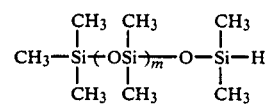

The mean degree of polymerization $\overline{m}$ was about 10.4 on the basis of proton ratio.

60.3 g (about 0.067 mol) of polydimethylsiloxane thus obtained was dissolved in 50 ml of dry toluene. In an argon atmosphere 30 ml (0.22 mol) of vinyldimethylchlorosilane and a 14 μl of ethanol solution of chloroplatinic acid (0.193 mol/l) as catalyst were added and the whole mixture was agitated for 2 hr at 80° C. IR measurement of this mixture showed that an absorption peak (2175 cm$^{-1}$) assigned to the Si-H bond at the terminal of the starting polydimethylsiloxane completely disappeared. In an argon atmosphere removal of the solvent and the excess dimethylchlorosilane of this solution by evaporation afforded about 62 g of polydimethylsiloxane with a dimethylchlorosilyl group at one terminal.

EXAMPLE 1

1.0 g (8.90 mmol) of the poly(1-trimethylsilylpropyne) obtained in Reference Example 1 was dissolved in 200 ml of THF. To this solution was added 6.0 ml (9.60 mmol) of a n-butyllithium in hexane (1.60 mol/l) at 0° C. in an argon atmosphere and agitation for 3 hr gave a red solution to which 20 g (about 22 mmol) of the polydimethylsiloxane with a dimethylchlorosilyl group at one terminal which was obtained in Reference Example 2 was added and the whole mixture was stirred for additional 15 min at 0° C. After the reaction solution turned from red to colorless and transparent, the solution was poured into 2 liters of methanol to form a precipitate which was filtered and dissolved in 200 ml of toluene and then poured into 2 liters of methanol to form precipitate. The precipitate was purified by reprecipitation repeated several times. Filtration and drying the precipitate gave 1.32 g of a white polymer. GPC measurement of the polymer proved that the number-average and the weight-average molecular weights were $5.05 \times 10^5$ and $2.18 \times 10^6$, respectively, calculated as polystyrene. The IR spectra and the elementary analysis gave the following results:

IR spectra (cm$^{-1}$): 2980(s), 2920(s), 1565(s), 1433(m), 1370(m, characteristic absorption of the methyl group on the main chain polytrimethylsilylpropyne), 1260(s, characteristic absorption of the methyl group on the side chain polydimethylsiloxane), 1250(s, characteristic absorption of the trimethylsilyl group on the main chain polytrimethylsilylpropyne), 1180(m), 1100(s, characteristic absorption of the siloxane linkage), 1020(s), 915(m), 840(s), 800(s), 750(s), 685(m), 630(m).

Elementary analysis (%): C: 55.21, H: 9.85.

It is concluded from the above results that the polymer formed was confirmed to be a poly(1-trimethylsilylpropyne)/polydimethylsiloxane graft copolymer, where the structure corresponds to that in which a part of the hydrogen atoms in the methyl groups directly combining with the double bonds on the main chain of poly(1trimethylsilylpropyne) of the starting material are substituted by the group expressed by the following general formula:

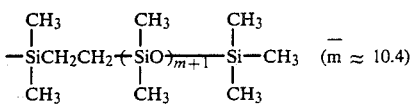

Further, the carbon content in the elementary analysis enabled to calculate the ratio in moles of the monomer units on the main chain poly(1-trimethylsilylpropyne) to those on the side chain polydimethylsiloxane, and the ratio obtained was 63/37.

The graft copolymer thus obtained was dissolved in toluene and let flow on a glass plate. Slow removal of toluene by evaporation gave a strong homogeneous membrane of 18 μm thickness which was attached to an apparatus for gas permeation test and permeability coefficients for oxygen and nitrogen were measured. Results are shown in Table 1.

Further, the graft copolymer in a 0.5 % by weight solution in toluene was spreaded on a surface of water to obtain a thin film with a about 250Å thickness. A membrane was prepared by twice building up the thin film on Duragard which was applied to a apparatus for gas permeation test to measure the gas permeability speed of oxygen and nitrogen. Results are shown in Table 2. Reestimation conducted after 30 days revealed no difference in the permeability speed.

REFERENCE EXAMPLE 3

(Preparation 2 of polysiloxane reactive at one terminal)

The same procedure was followed as in Reference Example 2, except that 7.2 g (0.0798 mol) of trimethylsilanol, a 50 ml hexane solution of n-butyllithium (0.080 mol), and 30 ml (0.275 mol) of dimethylchlorosilane were employed to obtain polydimethylsiloxane having the following structure:

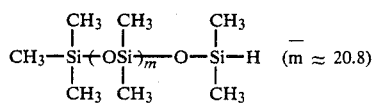

Further, 62.0 g of the polydimethylsiloxane was brought into the hydrosilylation reaction with vinyldimethylchlorosilane in the same manner as in Reference Example 2, to obtain about 64 g of polydimethylsiloxane with a dimethylchlorosilyl group at one terminal.

EXAMPLE 2

The same process as in example 1 was followed except that, in place of polydimethylsiloxane having a dimethylchlorosilyl group at one terminal which was obtained in Reference Example 2, 35 g (about 21 mmol) of polydimethylsiloxane having a dimethylchlorosilyl group at one terminal which was obtained in Reference Example 3 was employed. The product obtained was 1.50 g of a poly(1-trimethylsilylpropyne)/polydimethylsiloxane graft copolymer in the structure of which a part of hydrogen atoms of the methyl groups which were directly connected to the double bonds on the main chain of poly(1-trimethylsilylpropyne) were substituted by a group expressed by the following general formula:

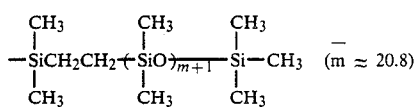

This substance gave the same IR spectra as in Example 1, but the absorption at 1260 cm$^{-1}$ of the methyl group on the side chain polydimethylsiloxane was stronger. Elementary analysis gave the following values.

Elementary analysis (%): C: 50.14, H: 9.53.

The ratio in moles of the monomer units on the main chain poly(1-trimethylsilylpropyne) to those on the side chain polydimethylsiloxane could be calculated from the carbon content shown above, giving 45/55. By GPC, the number-average and the weight-average molecular weights reduced to polystyrene were found to be $5.24 \times 10^5$ and $2.54 \times 10^6$, respectively.

The graft copolymer thus obtained was dissolved in toluene and the solution was spreaded on a glass plate, the solvent toluene was slowly removed by evaporation, to obtain a strong homogeneous film of 38 μm thickness. This film was applied on an apparatus for gas permeation test and the permeability coefficient was measured for oxygen and nitrogen. Results are shown in Table 1.

Further, a 0.5% by weight solution of this graft copolymer was spreaded on a surface of water to obtain a thin film of which the thickness was about 250Å. A membrane for gas permeation prepared by doubly building up the thin film on Duragard was attached to an apparatus for gas permeation test to measure the permeability speed of oxygen and nitrogen. Results are shown in Table 2. The same permeability speeds were obtained when measurement was repeated in 30 days.

REFERENCE EXAMPLE 4

(Preparation 3 of polysiloxane reactive at one terminal)

The same procedure as in Reference Example 2 was followed except that 3.7 g (0.040 mol) of trimethylsilanol, 26 ml of a hexane solution of n-butyllithium (0.042 mol), and 20 ml (0.184 mol) of dimethylchlorosilane were employed, to obtain polydimethylsiloxane having the following structure:

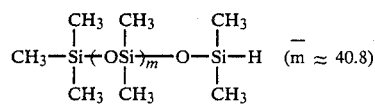

Further, the hydrosilylation reaction, as appeared in Reference Example 2, of 60.0 g of the above polydimethylsiloxane with vinylchlorosilane gave about 61 g of polydimethylsiloxane with a terminal dimethylchlorosilyl group.

EXAMPLE 3

The same procedure as in Example 1 was followed except that 58 g (about 20 mmol) of polydimethylsiloxane with a terminal dimethylchlorosilyl group prepared in Reference Example 4 was employed in place of the polydimethylsiloxane with a terminal dimethylchlorosilyl group prepared in Reference Example 2. The product was 1.81 g of a poly(1-trimethylsilylpropyne)/-polydimethylsiloxane graft copolymer in the structure of which a part of the hydrogen atoms of the methyl groups directly combining with the double bonds on the main chain of poly(1-trimethylsilylpropyne) were substituted by the group expressed by the following general formula:

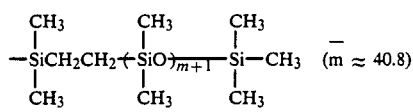

IR spectra were the same as in Example 1, but the absorption at 1260 cm$^{-1}$ of the methyl group on the side chain polydimethylsiloxane was still stronger. Elementary analysis gave the following result.

Elementary analysis (%): C: 45.20, H: 9.20.

The ratio in moles of the monomer units on the main chain poly(1-trimethylsilylpropyne) to those on the side chain polydimethylsiloxane calculated from the carbon content shown above was 31/69. The number-average and the weight-average molecular weights estimated by GPC were $5.71 \times 10^5$ and $1.77 \times 10^6$, respectively.

A solution in toluene of the graft copolymer thus prepared was spreaded on a glass plate and the toluene was slowly removed by evaporation, to obtain a strong homogeneous film having a thickness of 45 μm. This film was applied to an apparatus for gas permeation test and the permeability coefficient was measured for oxygen and nitrogen. Results are shown in Table 1.

Further, a 2% by weight solution in toluene of the graft copolymer was spreaded on the surface of water to obtain a thin film having a about 420Å thickness. This film was doubly built up on Duragard and applied to an apparatus for gas permeation test to measure the permeability speed of oxygen and nitrogen. Results are shown in Table 2. In addition, there was observed no difference in the permeability speed when the measurement was repeated after 30 days.

REFERENCE EXAMPLE 5

(Preparation 4 of polysiloxane reactive at one terminal)

3.90 g (0.0432 mol) of trimethylsilanol was dissolved in 200 ml dry THF and 29 ml of a hexane solution (1.6 mol/l) of n-butyllithium (0.046 mol) was added to it in a stream of argon. After 10 min agitation, 41.6 g (0.561 mol) of hexamethylcyclotrisiloxane and 39.5 g (0.253 mol) of tris(3,3,3-trifluoropropyl)trimethylcyclotrisiloxane in 150 ml of dry THF were added and the solution was stirred for 20 hr at the room temperature in an argon atmosphere. As a terminator, 40 ml (0.367 mol) of dimethylchlorosilane was added to this solution to stop the living polymerization. The solvent was removed under a reduced pressure, salts deposited were separated by filtration and the remainder was heated at 150° C. for 3 hr under a vacuum of not more than 0.1 mmHg, to remove unreacting cyclohexane and the excess of terminator. 72.5 g of a colorless transparent and viscous liquid was obtained. The IR and NMR measurements were conducted with the polymer obtained. Result confirmed that this polymer is polyorganosiloxane of which structure is expressed by the following formula:

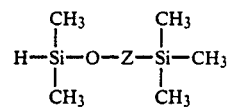

where Z is a form of the repeating units consisting of

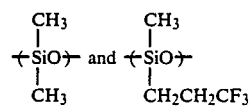

and the ratio of the two forms of the repeating units proved to be 72/28 by NMR estimation on the basis of proton ratio and the mean degree of polymerization was 27.8.

The hydrosilylation reaction, as conducted in Reference Example 2, of 60.0 g of this polyorganosiloxane with vinyldimethylchlorosilane gave about 61 g of polyorganosiloxane with a terminal dimethylchlorosilyl group.

EXAMPLE 4

The same procedure was followed as in Example 1 except that 45 g (about 16 mmol) of the polyorganosiloxane with a terminal dimethylchlorosilyl group prepared in Reference Example 5 was employed in place of the polydimethylsiloxane with a terminal dimethylchlorosilyl group prepared in Reference Example 2. The product was 1.32 g of poly(1-trimethylsilylpropyne)/polydimethylsiloxane graft copolymer. The structure corresponds to that in which a part of the hydrogen atoms of the methyl groups directly combining with double bonds on the main chain of poly(1-trimethylsilylpropyne) are substituted by the groups expressed by the following general formula:

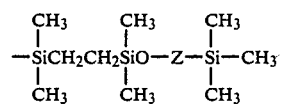

(where Z is a polyorganosiloxane consisting of the following two forms of repeating units:

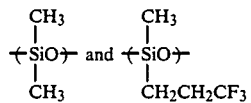

and the ratio in moles of the two forms is 72/28 and the means degree of polymerization is about 27.8).

IR spectra and elementary analysis gave the following results:

IR spectra (cm$^{-1}$): 2980(s), 2920(s), 1565(s), 1433(m), 1370(m, characteristic absorption of the methyl group on the main chain polytrimethylsilylpropyne), 1260(s, characteristic absorption of the methyl group on the side chain polysiloxane), 1250(s, characteristic absorption of the trimethylsilyl group on the main chain polytrimethylsilylpropyne), 1210(s, characteristic absorption of the trifluoromethyl group), 1180(m), 1130(s, absorption of the trifluoromethyl group), 1100(s, characteristic absorption of the siloxane bonding), 1020(s), 915(m), 840(s), 800(s), 750(s), 740(s), 685(m), and 635(m).

Elementary analysis (%): C: 44.53, H: 8.63.

The ratio in moles of the monomer units on the main chain poly(1-trimethylsilylpropyne) to those on the side chain polyorganosiloxane was calculated from the carbon content above to be 36/63. Further, the number-average and the weight-average molecular weights as estimated by GPC were $1.94 \times 10^5$ and $9.50 \times 10^5$, respectively, reduced to polystyrene.

The graft copolymer thus prepared was dissolved in toluene and spreaded on a glass plate. The solvent toluene was slowly removed by evaporation, to obtain a strong and homogeneous film having a 20 μm thickness. This film was applied to an apparatus for gas permeation test and the permeability coefficient was measured for oxygen and nitrogen. Results are shown in Table 1.

Furthermore, a 0.5% by weight solution in toluene of this graft copolymer was spreaded on a surface of water to obtain a thin film having a about 210Å thickness. This thin film was built up to 3 layers on Duragard and applied to an apparatus for gas permeation test to estimate the permeability speed of oxygen and nitrogen. Results are shown in Table 2. No difference in the permeability speed was observed when the same measurement was conducted in 30 days.

Industrial Applicability

As has been described above, the poly(disubstituted acetylene)/polyorganosiloxane graft copolymer of the present invention provides a material of practical use for preparing membranes for gas separation which have improved the defects of poly(disubstituted acetylene), that is the low separation coefficient for gases and the deterioration of the gas permeability coefficient during a prolonged use, and achieved high permeability and separability for gases and still more have sufficiently high strength of membrane. Therefore, separation and concentration of various gases, such as in the production of oxygen-enriched air, can be accomplished with a high efficiency by use of membranes produced from the graft copolymer of the present invention.

TABLE 1

| | Permeability Coefficient | | Separation Coefficient $P_{O2}/P_{N2}$ |
|---|---|---|---|
| | Oxygen, $P_{O2}$ ($cm^3 \cdot cm/ cm^2 \cdot sec \cdot cmHg$) | Nitrogen, $P_{N2}$ ($cm^3 \cdot cm/ cm^2 \cdot sec \cdot cmHg$) | |
| 1 | $2.88 \times 10^{-8}$ | $1.18 \times 10^{-8}$ | 2.44 |
| 2 | $1.30 \times 10^{-8}$ | $4.19 \times 10^{-9}$ | 3.10 |
| 3 | $2.69 \times 10^{-8}$ | $1.14 \times 10^{-8}$ | 2.36 |
| 4 | $1.31 \times 10^{-8}$ | $5.02 \times 10^{-9}$ | 2.61 |

TABLE 2

| | Permeability Speed | | Separation Coefficient $Q_{O2}/Q_{N2}$ |
|---|---|---|---|
| | Oxygen, $Q_{O2}$ ($cm^3/cm^2 \cdot sec \cdot cmHg$) | Nitrogen, $Q_{N2}$ ($cm^3/cm^2 \cdot sec \cdot cmHg$) | |
| 1 | $2.53 \times 10^{-3}$ | $1.00 \times 10^{-3}$ | 2.53 |
| 2 | $1.13 \times 10^{-3}$ | $3.28 \times 10^{-4}$ | 3.45 |
| 3 | $1.92 \times 10^{-3}$ | $7.68 \times 10^{-4}$ | 2.50 |
| 4 | $1.17 \times 10^{-3}$ | $4.07 \times 10^{-4}$ | 2.81 |

We claim:

1. Poly(disubstituted acetylene)/polyorganosiloxane graft copolymer, comprising the repeating unit of said copolymer being expressed by the following general formula:

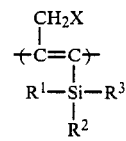

(where $R^1$–$R^3$ are the same or different groups selected from alkyl, substituted alkyl, phenyl, and substituted phenyl groups and X is a hydrogen atom or a group expressed by the following general formula:

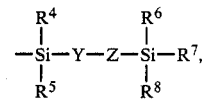

and $R^1$–$R^3$ and X may be arbitrarily different for different repeating units. Y is an oxygen atom or a divalent organic group. Z is a polyorganosiloxane chain and $R^4$–$R^8$ are an alkyl, a substituted alkyl, a phenyl or a substituted phenyl group and they may be the same or different to each other), the ratio in moles of the repeating units on the main chain, poly(substituted acetylene), to the repeating units on the side chain, polyorganosiloxane, being in the range from 90/10 to 10/90 and the molecular weight being not less than 10,000.

* * * * *